United States Patent [19]

Hastings, Jr.

[11] 4,244,627

[45] Jan. 13, 1981

[54] LIFT CYLINDER ASSEMBLY

[75] Inventor: Russell Hastings, Jr., Battle Creek, Mich.

[73] Assignee: Clark Equipment Company, Buchanan, Mich.

[21] Appl. No.: 46,892

[22] Filed: Jun. 8, 1979

[51] Int. Cl.³ .............................................. F16C 29/02

[52] U.S. Cl. .................................... 308/4 R; 308/3.5; 254/93 R

[58] Field of Search ............... 308/4 R, 4 C, 4 A, 3.5, 308/3 R; 254/93 R

[56] References Cited

U.S. PATENT DOCUMENTS

| | | | |
|---|---|---|---|
| 3,999,467 | 12/1976 | Engquist | 308/4 R |
| 4,026,524 | 5/1977 | Silvey | 254/93 R |
| 4,076,214 | 2/1978 | Colly | 254/93 R |

*Primary Examiner*—Lenard A. Footland
*Attorney, Agent, or Firm*—J. C. Wiessler

[57] ABSTRACT

A lift cylinder including a tubular outer cylinder having an inner cylindrical surface cooperable with an extendible piston and piston rod assembly to define an annular space therebetween, and an annular guide bushing supported within the annular space in a manner to eliminate eccentricity stack-up. "Tolerance stack-up" is defined as the compounding of eccentricity by mounting one eccentric part upon another.

6 Claims, 3 Drawing Figures

LIFT CYLINDER ASSEMBLY

BACKGROUND OF THE INVENTION

The present invention relates generally to lift cylinder assemblies, and more particularly to an upper piston rod guide bushing and mounting arrangement therefor.

In a cylinder-piston assembly such as a hydraulic lift cylinder which includes a hollow cylinder having an elongated cylindrical piston rod supported therein for retractable extension outwardly from the cylinder, it is important that proper sealing and guide means be provided adjacent the outer end of the cylinder from which the piston rod extends to prevent binding and fluid leakage during operation. To permit the base of the cylinder to be desirably closed, as by being first fixedly secured to a base block or the like, it is necessary to assemble the vee packings and associated packing expansion means on the lower end of the piston rod and to thereafter insert the piston and associated packing through the upper end of the cylinder. It is important that there be no sharp edge, as an annular groove, that might cut or damage the vee packings. In such cylinder-piston assemblies, and particularly in high pressure lift cylinders, it is conventional to secure a tubular extension to the upper end of a cylinder for supporting a guide bushing which receives the piston rod therethrough in sliding relation, and to maintain the piston in a concentrically spaced relation from the inner surface of the cylinder. The tubular extension has a larger diameter inner cylindrical surface than the main cylinder bore so that annular retainer ring grooves therein will not damage the packings. It is necessary that the cooperating surfaces of the cylinder, piston rod, and guide bushing be machined to close tolerances and fits to prevent the associated packings from extruding into the clearance spaces. The difficulty in the known constructions lies in controlling the eccentricities of the associated upper cylinder ends, the tubular extensions, the guide bushings, and the piston so as to prevent a stack-up of eccentricity tolerances which would cause binding when the piston rod assembly is extended and thereby lead to premature wear and failure of the cylinder-piston assembly.

In addition, such binding as the piston approaches the end of its travel outwardly of the cylinder results in additional friction during subsequent retraction of the piston rod assembly which can introduce into the lift cylinder assembly a resonant vibration during lowering of the load on the upright of a fork lift truck, for example. It is the type of problem which may or may not occur in a given operation and tends to be somewhat unpredictable, but does occur from time to time dependent upon whether resonance is encountered to effect vibration as a result of additional friction under certain conditions of lift height, lowering speed, fork load, length of chain, elasticity, and the like.

SUMMARY OF THE INVENTION

One of the primary objects of the present invention is to provide a cylinder-piston assembly having a novel guide bushing mounting arrangement adjacent the end of the cylinder from which the piston rod extends, which substantially reduces eccentricity tolerance stack-up heretofore encountered in devices of this nature.

Another object of the present invention is to provide a lift cylinder assembly including an outer cylinder adapted to receive an extendible piston rod therein, an annular guide bushing supported immediately between the outer cylindrical surface of the piston rod and the upper end of the cylinder bore to minimize or eliminate eccentricity stack-up therein, and impact rings retained within a cylindrical bore of larger diameter than the cylinder bore, the impact rings being disposed in abutting relation with the guide bushing to absorb impact forces imparted to the guide bushing when the piston reaches its outer limit of travel.

In carrying out the primary objects of the present invention, a tubular cylinder is provided having first and second generally concentric inner cylindrical surfaces, the larger diameter cylindrical surface being disposed adjacent an open end of the cylinder and defining an annular shoulder with the smaller diameter cylindrical surface. An elongated cylindrical piston rod is disposed within the cylinder for extension outwardly from the open end thereof, the piston having packings disposed about the lower end portion of the piston rod, with an annular stop member immediately above the packings, which is fixedly secured to the rod to transmit the upward thrust of the packings to the rod.

An annular guide bushing is supported within the cylinder adjacent the upper annular shoulder and has a portion depending into the annular space between the piston rod and the inner cylindrical surface of the cylinder to slidably receive the piston rod therethrough. The larger diameter inner surface of the cylinder has an annular groove therein to receive segmented rings which abut the upper end of the guide bushing and serve to resist impact forces imparted to the guide bushing when the piston reaches its outer limit of extension. A retainer ring is secured within the larger diameter cylindrical bore of the cylinder to entrap an annular wiper packing in engagement with the outer peripheral surface of the piston rod to prevent outward passage of hydraulic fluid or the like during actuation of the lift cylinder assembly. Longitudinally extending drain holes are provided through the guide bushing and serve to bleed off fluid which may bypass the guide bushing in an outward direction.

Further objects and advantages of the present invention, together with the organization and manner of operation thereof, may best be understood by reference to the following description taken in connection with the accompanying drawings, in the several figures of which like reference numerals identify like elements.

DESCRIPTION OF A PREFERRED EMBODIMENT

Figure 1:
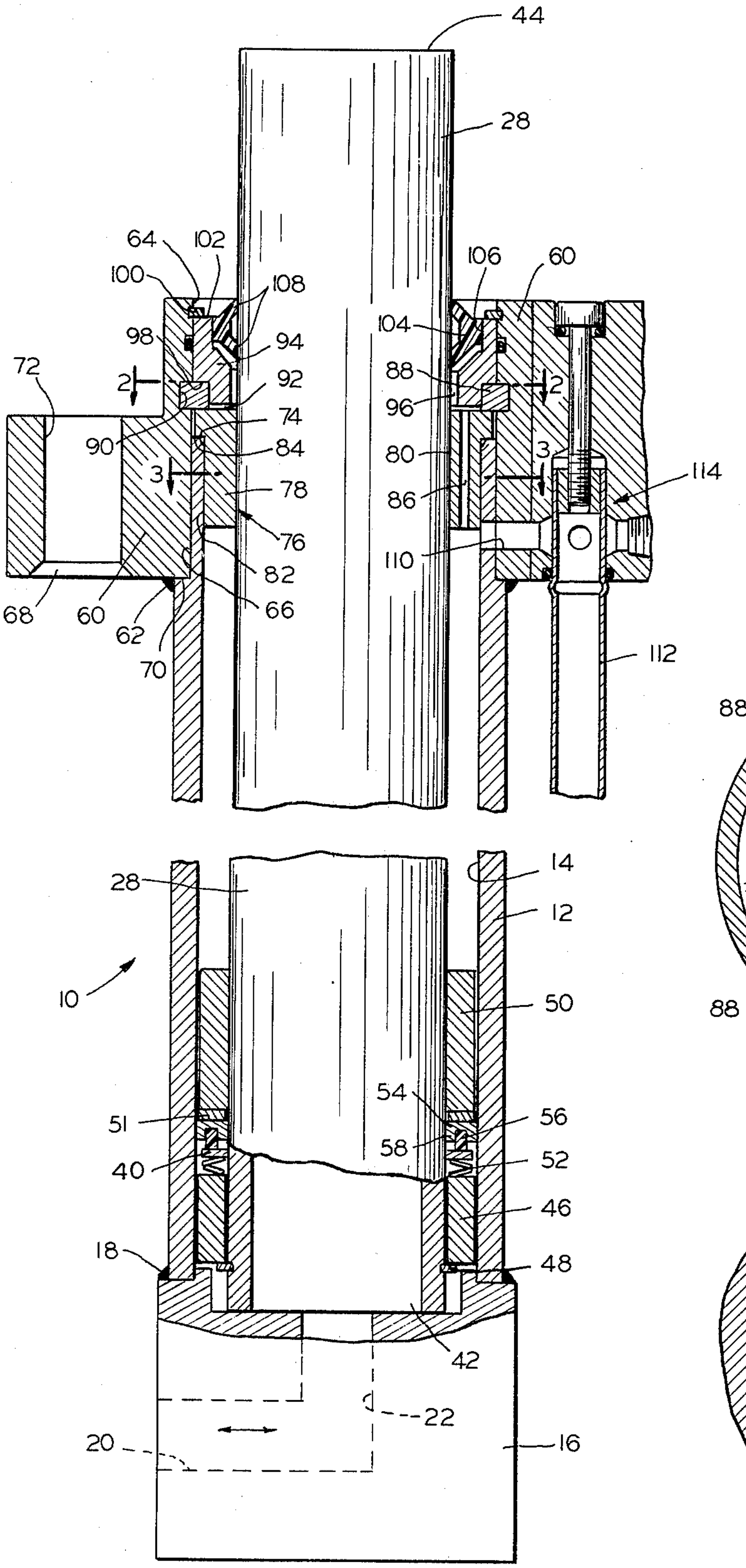
FIG. 1 is a foreshortened longitudinal median sectional view of a cylinder-piston assembly employing an upper guide bushing and packing arrangement in accordance with a preferred embodiment of the present invention.
Figure 2:
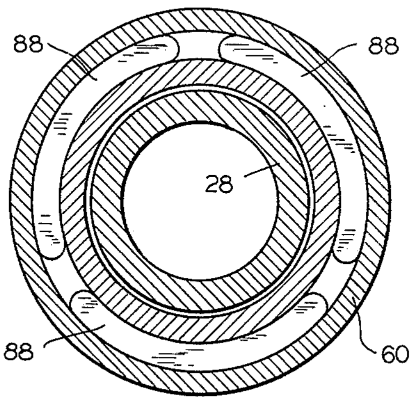
FIG. 2 is a transverse sectional view taken substantially along the line 2—2 of FIG. 1.
Figure 3:
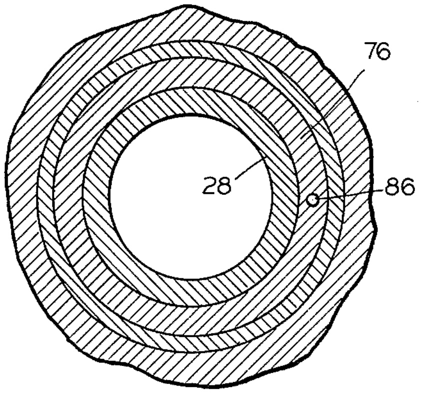
FIG. 3 is a transverse sectional view taken substantially along the line 3—3 of FIG. 1.

Referring to the drawings, the present invention is illustrated as being embodied in a cylinder-piston assembly indicated generally at 10. The cylinder-piston assembly 10 is of the type conventionally used with an industrial lift truck and in such use is generally referred to as a lift cylinder. The lift cylinder 10 embodying the present invention merely exemplifies one application of the present invention, it being understood that the present invention may find ready adaptation to numerous applications wherein machining tolerances between relatively moving parts must be closely held and tolerance stack-ups maintained at a minimum to insure smooth operation.

The lift cylinder 10 includes an outer elongated tubular shell or cylinder 12 made of a high strength metal such as steel or the like. The tubular cylinder 12 defines an axial cylindrical cavity or chamber 14 therein, the inner peripheral surface of the cylinder 12 being honed in a conventional manner. A base block 16 is suitably secured to the lower end of the cylinder 12 as by welding or other suitable means at 18, and includes a fluid flow passage 20 adapted to receive a fluid flow conduit (not shown) for selective connection in a conventional manner to a source of fluid pressure and to a reservoir by way of a directional control valve. Passage 20 communicates with the interior of an elongated hollow piston rod 28, which is open at the bottom and closed at the top, by way of a passage 22. The piston rod 28 is shown fully retracted in cylinder 12.

The piston rod 28 comprises an elongated tubular member which has a cylindrical outer peripheral surface of a diameter less than the diameter of the cylindrical cylinder chamber 14 so as to define an annular space therebetween. The lower open end 42 and a closed upper end 44 of the piston rod is such that upon the introduction of fluid pressure below the piston rod assembly, it will be caused to move longitudinally outwardly from the cylinder 12. The piston rod 28 has an annular bushing 46 about the lower end thereof, the lower surface of the bushing 46 engaging an annular snap ring 48 received within an annular groove in the outer peripheral surface of the piston rod adjacent the lower end thereof. The annular bushing 46 has a smooth outer peripheral surface adapted to engage the wall of cylinder chamber 14 in sliding relation therewith. The outer peripheral surface of the bushing 46 and the inner cylindrical surface of the cylinder 12 are of close tolerances such that the bushing 46 provides lateral support and concentric guidance for the lower end of the piston as it moves longitudinally with the piston rod relative to the outer cylinder.

An annular stop member 50 having an outer diameter less than the diameter of chamber 14, is permanently brazed or otherwise secured to the piston rod 28 to serve as an abutment for a thick brass washer 51 having a loose sliding fit both inside and outside, against which a U-cup 54 can exert its upward thrust without danger of becoming extruded into the clearance space between stop member 50 and chamber 14, thus constituting a piston which, in combination with piston rod 28, serves as a piston rod assembly that transmits an upward thrust equal to the hydraulic pressure times the entire cross-sectional area of chamber 14. For the purpose of this application the assembly of parts on the piston rod between stop ring 48 and stop member 50 comprises the referenced piston, while the piston rod 28 comprises the hollow cylindrical element thereof and the closed end 44. The stop ring 50 serves also to limit outward extension of the piston rod during operation of the lift cylinder as will become more apparent hereinbelow.

Resilient coil springs 52 are pocketed in longitudinal holes within bushing 46, and extend upwardly against a washer 40 which compresses a resilient annular ring member 56 which expands within an annular U-packing 54 which has downward annular leg portions 58 engaging the outer surface of piston rod 28 and the inner surface of cylinder chamber 14 in a known manner.

The present invention is also directed to means for providing concentric guidance and lateral support for the piston rod 28 adjacent the upper end of the outer cylinder 12 during extension of the piston rod. To this end, the outer cylinder 12 includes a mounting block 60 forming an extension of the outer elongated cylinder portion 12. Mounting block 60 is secured to the cylinder portion 12 as by welding at 62. The mounting block 60 has a cylindrical bore 64 therethrough, the lower portion of which engages a recessed or reduced diameter surface portion 66 on the outer peripheral surface of the cylinder 12 adjacent its upper end. A lower surface portion 68 of the mounting block abuts a radial shoulder 70 defined between the annular surfaces 64 and 66. The mounting block 60 provides one means for securing the lift cylinder assembly 10 to an associated support frame structure as through mounting bolts received through mounting holes 72 in the mounting block, only one of which is shown. In affixing the lift cylinder 10 to an associated support frame, the base block 16 or cylinder 14 may also be generally secured to the frame.

The cylindrical bore 64 in mounting block 60 has a diameter greater than the diameter of the inner cylindrical surface defining chamber 14 in outer cylinder 12 and extends longitudinally upwardly from the uppermost end 74 of the cylinder. The portion of the cylindrical bore 64 in the mounting block 60 disposed above end 74 of the outer cylinder 12 cooperates with the adjacent cylindrical surface of the cylinder chamber 14 to establish first and second generally concentric surfaces, respectively, in the elongated cylinder of the lift cylinder 10.

The aforementioned guidance and lateral support means includes an annular upper guide bushing indicated generally at 76 supported within the cylinder 12 adjacent the upper end 74 thereof. The guide bushing 76 has an annular portion 78 which extends downwardly within the annular space between the outer peripheral surface of the piston rod 28 and the inner cylindrical surface defining the cylinder chamber 14. The guide bushing 76 has a cylindrical axial bore 80 therethrough, the surface of which is honed and adapted to receive the piston rod 28 therethrough in sliding relation. The depending portion 78 of the guide bushing 76 has an outer annular surface 82 formed concentric with the inner bore surface 80. The inner and outer cylindrical surfaces 80 and 82, respectively, are machined to close concentricity tolerances so as to guide the piston rod 28 concentrically within the cylindrical bore 14 adjacent the upper end of the outer cylinder 12. The guide bushing 76 has an annular shoulder portion 84 of an outer diameter sufficient to form a surface for abutment with the upper end surface 74 of the cylinder 12. The annular guide bushing 76 includes at least one longitudinally extending drain hole 86 therethrough to provide a passage for draining hydraulic fluid wiped from the outer surface of the piston rod 28 during operation as will become more apparent hereinbelow.

Means are associated with the outer cylinder 12 and the guide bushing 76 to maintain the guide bushing in fixed longitudinal position adjacent the outer end 74 of cylinder 12. Such means includes impact ring means comprising three segmented coplanar arcuate ring portions 88 disposed in end-to-end relation. The segmented impact ring portions 88 are preferably of equal arcuate length, for example traversing almost 120° each, and are preferably square in cross-section. The arcuate segments 88 comprising the impact ring means are received within an annular groove 90 formed within the cylindrical bore 64 in the mounting block 60, the rings being positioned upwardly from the upper end 74 of the cylinder 12 so as to abut an upper end surface 92 of the annular guide bushing 76. In this manner, the stop ring segments 88 fixedly secure the guide bushing 76 against the upper end 74 of the outer cylinder 12 such that the upper guide bushing serves to limit outward extension of piston rod 28 through abutting the annular stop member 50 (which is welded or otherwise secured to the lower end of the piston rod 28) when the piston rod is extended outwardly from the cylinder 12.

An annular retainer member 94 has its peripheral surface adapted to be received within the bore 64 in the mounting block 60, and has an axial cylindrical bore 96 therethrough of a diameter substantially greater than the diameter of the piston rod 28 to allow free movement of the piston rod through the retainer member. The retainer member 94 includes a shouldered recess 98 to receive and abut the segmented ring portions 88 of the impact ring means for retaining the segmented ring portions within the annular groove 90. An annular snap ring 100 is retained within an annular groove in the cylindrical bore 64 of the mounting block 60 and abuts an upper end surface 102 of the retainer member 94 to prevent outward movement of the retainer member.

An annular wiper packing 104 is secured to an inner annular surface 106 of retainer member 94 and includes a pair of inwardly directed lips 108 adapted to engage the outer surface of piston rod 28 in wiping contact therewith. As the piston rod is extended outwardly from cylinder 12 through the introduction of hydraulic fluid into the inlet passage 20, the lips 108 of the wiper packing 104 serve to wipe any hydraulic fluid adhering to the outer surface of the piston rod 28 and cause the wiped oil to pass downwardly through the inner bore 96 of the retainer member 94 and through the drain hole 86 of the guide bushing. The wiped oil is thereafter drained through a drain passage 110 formed in the cylinder 12 and mounting block 60. To this end, a drain line 112 is secured to a portion of the support block 60 as indicated generally at 114, with the drain line 112 serving to return the wiped fluid to a reservoir (not shown) in a conventional manner.

Cylinder 12 is welded or otherwise secured to the base block 16 at 18 prior to inserting the piston rod assembly into the outer cylinder. The main annular packing element 54 and resilient expansion means 52,40,56 and guide bushing 46 and snap ring 48 are assembled on the piston rod 28 prior to inserting the piston rod assembly into cylinder 12. The piston rod assembly and associated packing means are thereafter inserted downwardly into the cylinder 12. It is essential that there be no sharp edges adjacent the upper end of cylinder 12 or mounting block 60 that might cut or otherwise damage the U-cup packing 54. For this reason, the cylindrical bore 64 in the mounting block 60 is made of a substantially larger diameter than the diameter of the cylinder chamber 14 such that the edges of the annular grooves which receive the impact ring segments 88 and snap ring 100 are disposed at a greater diameter than the diameter of the inner honed surface 14 of the outer cylinder and, correspondingly, at a greater diameter than the outer peripheral surface of the U-cup packing 54.

As noted above, in previous constructions of lift cylinders, there is generally a stack-up of eccentricity tolerances involving the upper piston rod guide bushing arrangement which may cause binding when the piston approaches its extreme upper limit of travel. This is particularly true in known lift cylinder constructions wherein a separable cap member is secured to the upper end of the outer cylinder and a guide bushing is secured directly to the cap member in a manner to receive the piston therethrough in guiding relation. The present invention has eliminated the stack-up of eccentricity tolerances at this point by mounting the upper guide bushing 76 directly between the cylindrical surface defining the cylindrical chamber 14 and the outer surface of piston rod 28. In this manner, the concentric surfaces 80 and 82 of the guide bushing 76 are machined to close tolerances which produce a minimum eccentricity with the associated honed inner surface of cylinder chamber 14 and the piston rod 28 received through the upper guide bushing for guidance and lateral support. The high strength impact ring segments 88 positioned to abut the upper end surface 92 of the upper guide bushing 76 provide an impact resistance means exhibiting substantially higher strength over other known stop ring constructions.

While the mounting block 60 has been described as being fixedly connected to the upper end of the outer cylinder 12, as by welding at 62, to establish the afore-described adjacent first and second inner concentric surfaces 64 and 14, respectively, it will be understood that the adjacent first and second concentric inner cylindrical surfaces 64 and 14 may be formed integral within the upper end portion of the outer cylinder 12, the outer cylinder being enlarged at its upper end to provide sufficient wall strength adjacent the larger diameter bore 64.

While a preferred embodiment of the present invention has been shown and described, it will be apparent to those skilled in the art that changes and modifications may be made therein without necessarily departing from the invention as defined in the claims appended.

I claim:

1. In a lift cylinder assembly, the combination comprising, a tubular elongated cylinder having an open end and first and second generally concentric inner cylindrical surfaces, said first cylindrical surface being disposed adjacent said open end and of a diameter greater than the diameter of said second cylindrical surface so as to define an annular shoulder therebetween, a piston rod supported within said cylinder for longitudinal extension outwardly from said open end, said piston rod having a cylindrical peripheral surface of a diameter less than the diameter of said second inner cylinder surface and defining an annular space therebetween, sole guide bushing means supported within said cylinder adjacent said annular shoulder, said guide bushing means having an annular portion extending within said annular space between said piston rod and said second inner surface of said cylinder and adapted to receive said piston rod therethrough in sliding relation and firmly engage said adjacent second inner surface, and means associated with said cylinder and said guide bushing means to maintain said guide bushing means in fixed longitudinal position within said cylinder.

2. The combination as defined in claim 1 including guide means supported on said piston rod opposite from the outer end of the piston rod which is extendible outwardly from said open end of the cylinder, said last mentioned guide means extending within said annular space between the piston rod and said second inner surface and engaging said second inner cylindrical surface in sliding relation therewith during extension and retraction of said piston rod and also engaging directly the outer peripheral surface of said piston rod, and stop means on said piston rod adapted to engage said guide bushing means and limit outward extension of said piston rod from said cylinder.

3. The combination of claim 1 wherein said means associated with said cylinder to maintain said guide bushing means in fixed longitudinal position within said cylinder includes impact ring means adapted to abut said guide bushing means and prevent longitudinal movement thereof.

4. The combination as defined in claim 3 wherein said guide bushing means includes a second annular portion having a diameter greater than the diameter of said first mentioned annular portion and of said second cylindrical surface of said cylinder, said annular portion of said guide bushing means engaging the annular shoulder between said first and second inner cylindrical surfaces of said cylinder, and wherein said impact ring means abuts said annular portion of said guide bushing to fixedly secure said annular portion between said annular shoulder and said impact ring means.

5. The combination of claim 4 including retainer ring means supported within said first inner cylindrical surface thereof, said retainer ring means being adapted to retain said impact ring means in fixed position.

6. The combination defined in claim 1 wherein said cylinder includes first and second tubular portions, said first tubular portion being secured to said second tubular portion in generally concentric relation therewith and having an inner cylindrical surface defining said first inner cylindrical surface of said cylinder, said second tubular portion of said cylinder defining said second inner cylindrical surface therein, and said annular shoulder portion comprising the outermost end of said second tubular portion.

* * * * *